Figure 1:
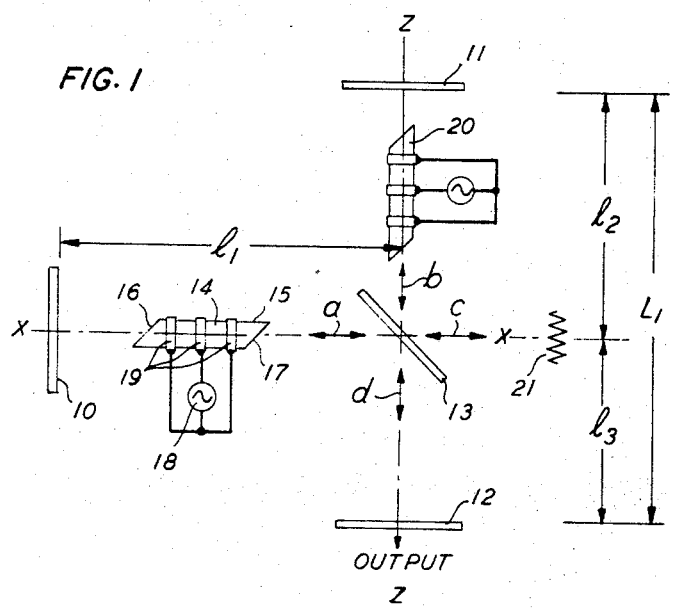

Dec. 3, 1968   M. DI DOMENICO, JR., ET AL   3,414,840
SYNCHRONIZATION OF POWER SOURCES
Filed Sept. 28, 1965                           2 Sheets-Sheet 1

INVENTORS  M. DI DOMENICO, JR.
           H. SEIDEL
BY
                    ATTORNEY

Dec. 3, 1968  M. DI DOMENICO, JR., ET AL  3,414,840
SYNCHRONIZATION OF POWER SOURCES
Filed Sept. 28, 1965  2 Sheets-Sheet 2

United States Patent Office

3,414,840
Patented Dec. 3, 1968

3,414,840
SYNCHRONIZATION OF POWER SOURCES
Mauro Di Domenico, Jr., Madison, and Harold Seidel, Fanwood, N.J., assignors to Bell Telephone Laboratories, Incorporated, New York, N.Y., a corporation of New York
Filed Sept. 28, 1965, Ser. No. 490,985
4 Claims. (Cl. 331—94.5)

This invention relates to arrangements for synchronizing two or more laser oscillators to produce a higher power output in a single oscillating mode.

The development of the optical maser, or laser, as it is now commonly referred to, has made possible the generation of coherent and highly monochromatic electromagnetic wave energy in the optical frequency range. As used herein, the term "optical frequency range" shall be understood to extend from the farthest infrared to beyond the ultraviolet.

Lasers operable in the optical frequency range typically comprise an optical cavity resonator in which there is located an appropriate active medium. Devices of this type, employing a cavity resonator formed by a pair of spaced, parallel reflectors, are described in United States Patent 2,929,922, issued on Mar. 22, 1960 to A. L. Schawlow and C. H. Townes. Resonators of this and other types are analyzed in Bell System Technical Journal articles by Fox and Li, volume 40, page 453; by Boyd and Gordon, volume 40, page 489; and by Boyd and Kogelnik, volume 41, page 1347.

Because optical cavity resonators are much larger than the wavelength of the signals supported therein, they are inherently multimode devices. As a consequence, laser oscillators are capable of simultaneously oscillating at a plurality of frequencies whose nominal center-to-center spacings, $f_c$, are given by $c/2L$, where $c$ is the velocity of light, and $L$ is the effective cavity length. Thus, the output spectrum from a laser oscillator typically consists of a plurality of spaced, discrete frequencies.

In addition, because the wavelength of the oscillations are orders of magniture smaller than the cavity length, the frequencies at which a laser oscillates are extremely sensitive to changes in the length of the cavity. As a result, the slightest change in cavity dimensions produces substantial changes in the output frequencies.

The presence of many frequencies in the output of a laser is generally undesirable in that the unwanted modes represent a loss to the system. In a laser adapted for communications purposes, the excitation of many different modes, and their critical dependence upon the cavity dimensions, has an adverse effect on the stability of the laser, and on the modulation and demodulation processes. All of these factors are important considerations in communications systems.

In addition to the above considerations, the output power per mode from a laser is generally less than is necessary for many applications. However, to increase the available power by synchronizing two or more lasers, which are typically subject to the above-mentioned limitations and complications, is particularly difficult.

It is, accordingly, an object of the present invention, to increase the power output from laser oscillators by synchronizing a plurality of lasers in a manner to restrict oscillations to a single mode.

The present invention recognizes that in order to synchronize two or more oscillators, the organized state of such a dynamic system must be highly distinguished from all other possible unorganized states and, further, the organized state must offer so compelling an advantage to system function that the oscillators accept the loss of the degrees of freedom of their independent operation and accept a collective interaction.

The system, however, must retain within its organization certain degrees of freedom including the freedom to hunt and to accommodate small perturbations.

In accordance with the present invention, these conditions are realized in a multibranched laser cavity structure which includes a freedback arrangement for intercoupling the active laser material located in the various branches of the cavity. The system is organized such that there is one, and only one, mode at which the plurality of active lasing regions, distributed within the various cavity branches, can oscillate. For all other modes, on the other hand, the system is highly lossy.

In one specific embodiment of the invention, adapted for synchronizing two lasers, a three-branched cavity structure is employed. Power is coupled among all the branches by means of a semi-transparent mirror, suitably located within the cavity structure. Such a power splitter is the equivalent of a 3 db hybrid junction. Two branches of the cavity, which couple to one pair of conjugate ports of the hybrid, contain regions of active laser material. One port of the second pair of conjugate ports couples to the third cavity branch, while the other port of the second pair of conjugate ports couples to a dissipative load.

It is an advantage of the present invention that the laser system oscillates in a highly stable manner at a single frequency and mode.

It is a further advantage of the invention that the power output is greater by the number of active laser regions included in the multibranched cavity.

Figure 2:
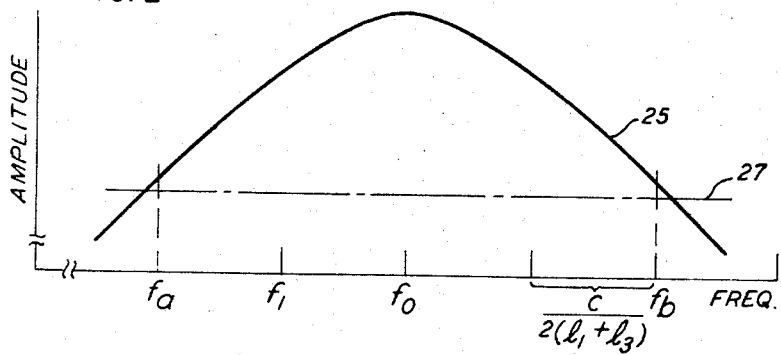
Figure 3:
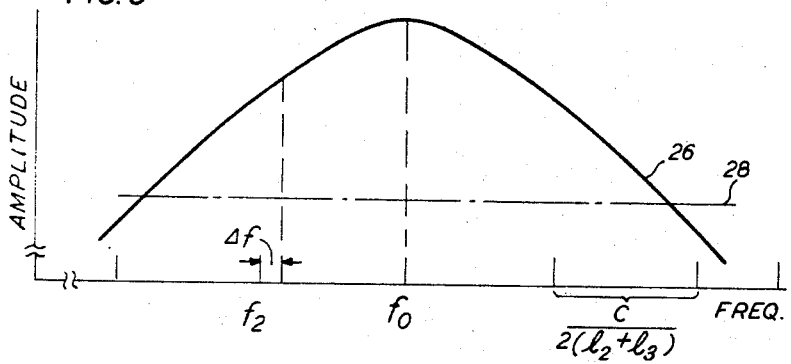
Figure 4:
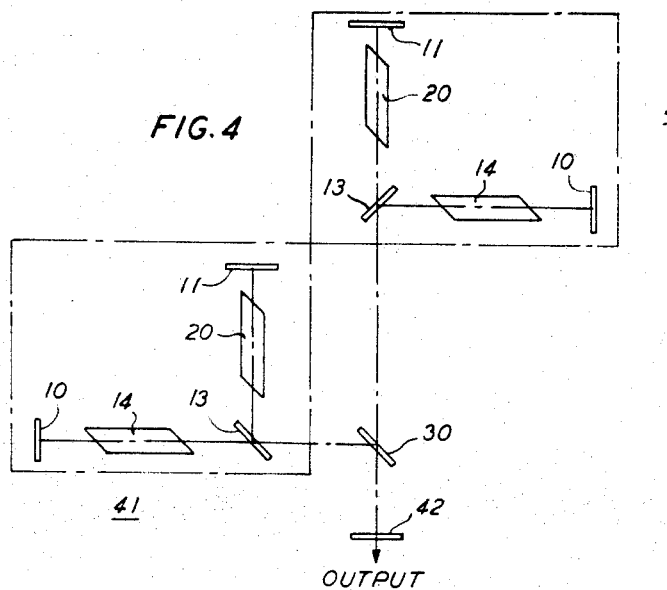
Figure 5:
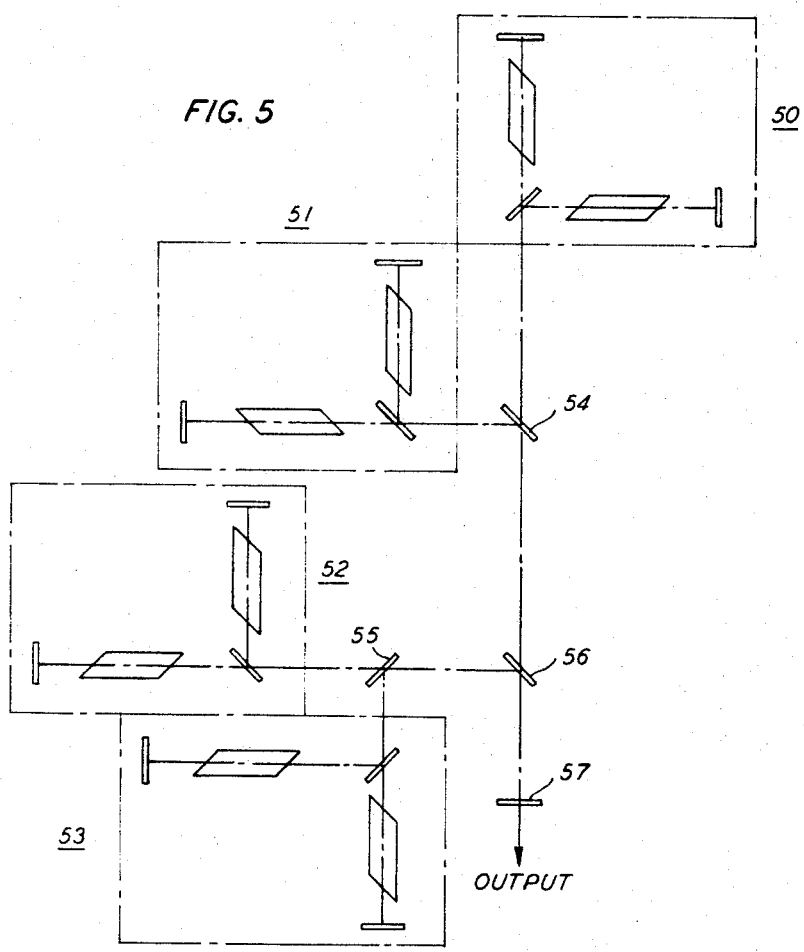

These and other objects and advantages, the nature of the present invention, and its various features, will appear more fully upon consideration of the various illustrative embodiments now to be described in detail in connection with the accompanying drawings, in which:

FIG. 1 shows a first embodiment of the invention adapted to synchronize two laser oscillators;

FIGS. 2 and 3, included for purposes of explanation, show the cavity modes, and gain curves for the two lasers of FIG. 1; and FIGS. 4 and 5 show the manner in which groups of two lasers, arranged as in FIG. 1, can be combined to synchronize four and eight lasers, respectively.

Referring to the drawings, FIG. 1 is a first illustrative embodiment of the invention adapted to synchronize two laser oscillators. In this embodiment, the laser cavities comprise three planar mirrors 10, 11 and 12. The centers of mirrors 11 and 12 are spaced apart a distance $L_1$ and are aligned along a common axis $z$—$z$ with their reflective surfaces parallel to each other. Mirror 10, on the other hand, is oriented with its surface perpendicular to the surfaces of mirrors 11 and 12, and is located between mirrors 11 and 12 at a distance $l_1$ from axis $z$—$z$.

As is the common practice in the laser art, one of the mirrors is partially transmissive; i.e., a few percent, and constitutes the output aperture of the oscillator through which energy is abstracted from the oscillator cavity. In the embodiment of FIG. 1, mirror 12 is partially transmissive, while mirrors 10 and 11 are made as highly reflective as the art permits.

Located at the intersection of axis $z$—$z$ and the normal to mirror 10, $x$—$x$, is a beam splitter 13 which, for example, can be a half silvered mirror, oriented with its surface at 45 degrees to the mirror surfaces. Advantageously, the beam splitter transmits approximately half the power incident upon its surface and reflects the other half. As noted by B. M. Oliver, in a letter to the December 1961 issue of the Proceedings of the Institute of Radio Engineers, page 160, a semitransparent mirror, inclined at 45 degrees to the direction of wave propagation, is the equivalent of a 3 db hybrid junction. As such, it has two pairs of conjugate ports and has the property that an incident signal, applied to one port of one pair of conjugate ports, divides equally between the other pair of conjugate ports.

For purposes of identification, the four ports of beam splitter 13 are labeled $a$, $b$, $c$ and $d$, of which $a$ and $b$ are a first conjugate pair, and $c$ and $d$ are the second conjugate pair.

Located in the region between mirror 10 and beam splitter 13, and coupling to port $a$ of the beam splitter, there is a first active laser medium 14 which, in the arrangement depicted, is a gas or gas mixture contained within an elongated tube 15 whose longitudinal axis is aligned along axis $x$—$x$. In accordance with current practice, the end surfaces 16 and 17 of tube 15 are inclined at Brewster's angle to the container axis. The laser material is excited by means of a high frequency power source 18 coupled to conductive straps 19, which encircle tube 15. It is recognized, however, that the invention is not limited to any particular laser material nor method of excitation. The arrangement described above, and shown in FIG. 1, is merely intended to be illustrative.

A second laser material 20 is located in the region between mirror 11 and beam splitter 13, and coupled to port $b$ of the beam splitter. In all respects, the second laser material, its container and source of excitation are the same as described above in connection with the first laser material 14.

For purposes of explanation, the structure of FIG. 1 will be considered, at the outset, as comprising two independent lasers. It should be understood, heowever, that such a simplifying assumption results in certain generalizations which are not strictly accurate. Nevertheless, it has the advantage that it provides a convenient means by which the operation of the invention can be explained and the results obtained at the point of operation are consistent with the actual workings of the device.

Referring to FIG. 1, the first of these lasers is defined by the cavity formed by mirrors 10 and 12 and includes the laser material 14. The second laser is defined by the cavity formed by mirrors 11 and 12 and includes the second laser material 20.

As is known, an optical cavity is capable of supporting many modes of oscillations. The longitudinal mode frequencies for the lowest order transverse modes for the cavity defined by mirrors 10 and 12 are represented graphically in FIG. 2 by the short vertical lines along the frequency axis. The nominal frequency separation between cavity modes is $c/2L$. Designating the distance between mirror 12 and beam splitter 13 as $l_3$, the frequency separation for the modes supported within this first cavity is $c/2(l_1+l_3)$.

A similar set of cavity modes exists for the second cavity defined by mirrors 11 and 12. These are depicted in FIG. 3, and are spaced apart a distance $c/2(l_2+l_3)$, where $l_2$ is the distance between mirror 11 and beam splitter 13.

If $l_1=l_2$, the modes for the two cavities are identical. If, on the other hand, $l_1$ does not equal $l_2$, the modes and the mode spacings for the two cavities are, in general, different. However, among all of the modes in the two cavities there does exist a number of modes in one of the cavities which have the same frequencies as do a number of modes in the second cavity. These corresponding pairs of modes, which have the same frequency, are separated by a beat frequency which is a function of the difference between $l_1$ and $l_2$, and is equal to $c/2(l_1-l_2)$. For the two particular sets of modes plotted, it can be seen that the mode frequency $f_0$ of FIG. 2 corresponds to one of the modes at the same frequency $f_0$ plotted in FIG. 3. None of the other modes shown in FIG. 2, however, are at the same frequency as any of the other modes shown in FIG. 3. As indicated above, the next pair of matching modes occurs at a frequency $\pm c/2(l_1-l_2)$ cycles away from the matching frequency $f_0$.

Also represented in FIGS. 2 and 3 are the Doppler-broadened gain curves 25 and 26 for the two lasers, and the threshold levels 27 and 28 at which the gain per pass for each laser exceeds the typical losses in the system due to useful loading, scattering, reflection, et cetera. (An additional loss, due to the coupling action of beam splitter 13 is separately discussed below and is not included as one of the losses which establish the threshold level.) It can be seen, from these curves, that all modes whose frequencies fall between $f_a$ and $f_b$ are capable of oscillation in their respective cavities unless measures are taken to suppress them. For the laser represented by FIG. 2, there are five such modes. For the laser represented by FIG. 3, there are three such modes.

So far in this discussion, the two lasers have been considered to operate independently of each other. It is apparent, however, that this is not so. For example, signal energy generated in laser material 14, enters port $a$ of beam splitter 13 wherein it divides. A portion of this signal is transmitted through the hybrid and an equal portion is reflected towards mirror 12. The transmitted portion is coupled out of the cavity structure through port $c$ and is lost. This loss is represented by the resistive termination 21. It should be observed, however, that it is not necessary to provide a specific terminating element. The mere coupling out of the cavity, with no means for coupling back into the cavity, would represent a loss to the system. In fact, the absence of further provisions for avoiding this loss of energy in the system, the laser would not operate. The manner in which this loss is selectively avoided will become apparent.

As to the signal component reflected toward mirror 12, it is reflected back toward the beam splitter and again divides. Part of the signal is reflected back towards mirror 10 and the active material 14, whereas the other part is transmitted through beam splitter 13 towards mirror 11 and the laser material 20. Thus, energy generated in laser material 14 stimulates the laser material 20.

A similar analysis of the action of the system on energy generated in laser material 20 shows that this energy is directed into and stimulates laser material 14. Such an analysis also shows that a portion of the energy generated by laser material 20 is similarly coupled out of the cavity by the action of the beam splitter.

As noted above, unless the gain in the system is unusually high, the coupling action of the beam splitter (which results in a substantial amount of energy being coupled out of the cavity) would totally prevent the system from oscillating. Thus, in order for the system to oscillate at all, further cooperation between the two interacting laser systems is required. In accordance with the invention, this further cooperation manifests itself in the phase relationships among the signals present in the paths containing the two active media.

For the conditions depicted in FIGS. 2 and 3, only those signal components that lie within the band $f_a$ to $f_b$ are capable of experiencing sufficient net gain to oscillate. More particularly, for the frequency $f_0$, which frequency is common to the modes supported in both cavities, the phase of the signal components coupled out of the cavity structure by the beam splitter, are ideally 180 degrees out of phase with each other. As a consequence, these two signal components experience destructive interference in port $c$ of the beam splitter and, therefore, ideally no net power is coupled out of the system at frequency $f_0$. For all other frenquencies, however, the phases of the signal components coupled out of the system by beam splitter 13 are such that some net power is lost. The amount of power lost is a function of the frequency difference between modes. Referring to FIGS. 2 and 3, the next pair of adjacent modes $f_1$ and $f_2$ are separated by a frequency difference $\Delta f$, and the system experiences a net loss for these modes which is an extremely sensitive function of this frequency difference. By selecting the cavity dimensions $l_1$ and $l_2$, and limiting the loop gain, the losses for all undesired longitudinal modes can be made sufficiently high to preclude oscillations at all frequencies except $f_0$. Thus, it is only for this one correlated state that the system oscillates.

While it is recognized that there are other frequencies for which the system is correlated, they exist outside the gain curve and, hence, oscillations at these remote frequencies cannot exist.

The design of a laser system, in accordance with the invention is relatively simple. The cavity lengths $l_1$ and $l_2$ are selected to provide the desired mode separation for the two sets of modes. Referring to FIGS. 2 and 3 the cavity is advantageously designed such that $(l_1-l_2) \approx c/2$ $(f_b-f_a)$ in order to limit oscillations to the single frequency $f_0$. It should be noted that $l_1$ and $l_2$ can be made as large as desired since it is only their difference that is significant. The system is then tuned so as to locate the two coincident modes at the peak of the gain curve by adjusting the cavity length $l_3$. As this length is common to both laser cavities, the effect of this adjustment is to shift both sets of modes along the frequency scale simultaneously.

In operation, the synchronized laser system described above is extremely efficient in that only one cavity mode is generated with substantial power. In particular, the power output is equal to twice the power available from each of the two lasers when operating separately. In addition, the system as a whole is relatively insensitive to change. Any tendency for change in either of the lasers is immediately communicated to the other laser and an accommodation between the two lasers is made. The system hunts and adapts to the new set of conditions, and while the newly established state may have a reduced output, the operation of the overall system is extremely stable.

The basic system depicted in FIG. 1 can be extended to include four, eight or, more generally, $2^n$ synchronized lasers, where $n$ is any integer. This is illustrated in FIGS. 4 and 5 for $n=2$ and 3, respectively. Specifically, FIG. 4 shows four lasers synchronized by taking two of the basic units illustrated in FIG. 1, and combining them by means of a semitransparent mirror. Thus, in FIG. 4, the two basic units, or groups of lasers, 40 and 41 are combined by means of the semitransparent mirror 30. In addition, they share a common mirror 42 (which corresponds to mirror 12 in FIG. 1). Each of the groups 40 and 41 comprises two orthogonally oriented mirrors 10 and 11, two regions of active laser material 14 and 20, and the beam splitter 13. (The same identification numerals are used to show the identity of these units to the structure of FIG. 1).

In like fashion, four groups 50, 51, 52 and 53 are coupled in FIG. 5 to synchronize eight lasers. Groups 50 and 51 are coupled by means of a semitransparent mirror 54. Groups 52 and 53 are coupled by means of a semitransparent mirror 55. The two pairs of coupled groups are, in turn, coupled by means of a third semitransparent mirror 56. All groups share, in common, a ninth mirror 57.

In all cases it is understood that the above-described arrangements are illustrative of but a small number of the many possible specific embodiments which can represent applications of the principles of the invention. Numerous and varied other arrangements can readily be devised in accordance with these priniples by those skilled in the art without departing from the spirit and scope of the invention.

What is claimed is:

1. In combination:

first and second laser oscillators each comprising a first mirror, a laser medium, and each sharing in common a second mirror;

said first mirrors and said common second mirror forming a pair of resonant cavities;

a 3 db hybrid junction having two pairs of conjugate ports located within a common region of said cavities for coupling wave energy among said mirrors and out of said cavities;

the laser medium for each oscillator being located between one of said first mirrors and one port of one of said pairs of conjugate ports;

and means for extracting wave energy from said oscillators.

2. A maser oscillator comprising:

a multibranch cavity;

means including a 3 db hybrid disposed within said cavity for coupling said branches together;

said hybrid having first and second pairs of conjugate ports;

one branch of said cavity, including a first region of active maser material, coupled to one port of said first pair of conjugate ports;

a second branch of said cavity, including a second region of active maser material, coupled to the other port of said first pair of conjugate ports;

a third branch of said cavity coupled to one port of said second pair of conjugate ports;

the other port of said second pair of said conjugate ports coupling out of said cavity;

and means for extracting wave energy from said cavity at a frequency for which the signal components generated by said two active maser materials are out of phase at said other port of said second pair of conjugate ports.

3. In combination;

$2^n$ synchronized laser oscillators, where $n$ is an integer;

said oscillators arranged in $n$ groups of two oscillators;

each of said $n$ groups of oscillators comprising two regions of active laser material, two mirrors and a 3 db quadrature hybrid junction having two pairs of conjugate ports;

the laser material of each oscillator in each group being disposed between one of said mirrors and one port of one of the pairs of conjugate ports of said hybrid junction;

means for coupling pairs of groups of oscillators comprising additional 3 db quadrature hybrid junctions each of which has two pairs of conjugate ports;

said pairs of groups of oscillators being coupled respectively to pairs of conjugate ports of said additional hybrid junctions;

the last of said additional hybrid junctions having one port of a second pair of conjugate ports coupled to a $(2n+1)$th mirror;

and means for extracting wave energy from said combination.

4. In combination;

a pair of maser oscillators each of which comprises a resonant cavity and an active maser material disposed within said cavity;

characterized in that said two cavities share a portion of cavity in common with each other;

a 3 db hybrid junction having two pairs of conjugate ports disposed within said common portion of cavity and adapted to couple the output of one of said maser materials to one port of one pair of conjugate ports and to couple the output of the other of said other maser materials to the other port of said one pair of conjugate ports;

the common portion of cavity being coupled to one port of the other pair of conjugate ports;

and means for coupling wave energy out of said combination at a frequency for which the signal components generated in said maser materials are out of phase in the other port of said other pair of conjugate ports.

No references cited.

JEWELL H. PEDERSEN, *Primary Examiner.*

B. LACOMIS, *Assistant Examiner.*